Sept. 15, 1925.                    S. APOSTOLOFF                    1,553,659
                                      DRY CELL
                       Filed Nov. 28, 1919         3 Sheets-Sheet 1
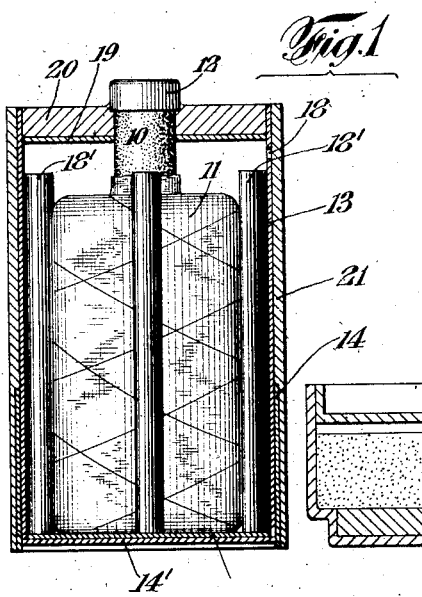
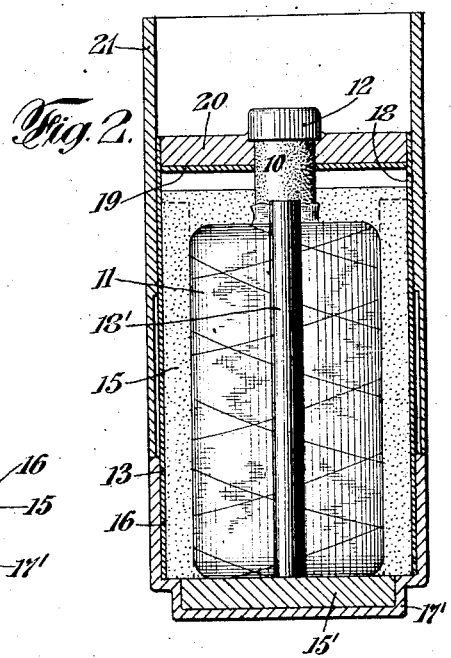
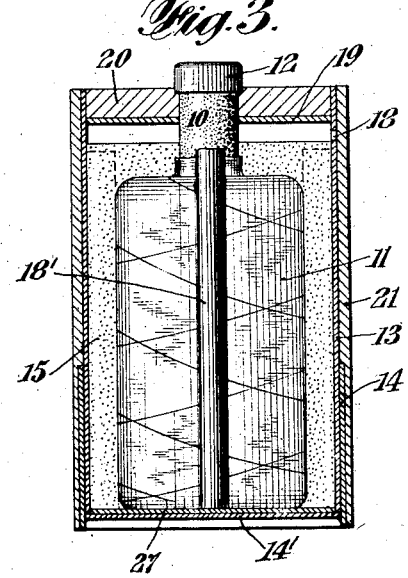
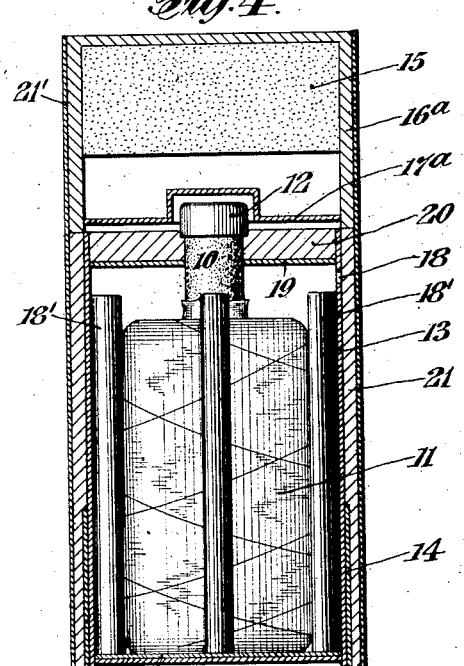
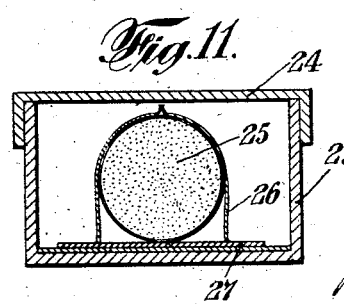
Inventor
Serge Apostoloff
By his Attorneys
Williams & Pritchard

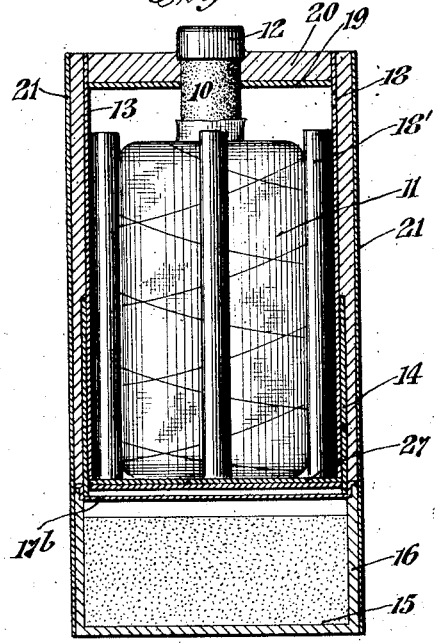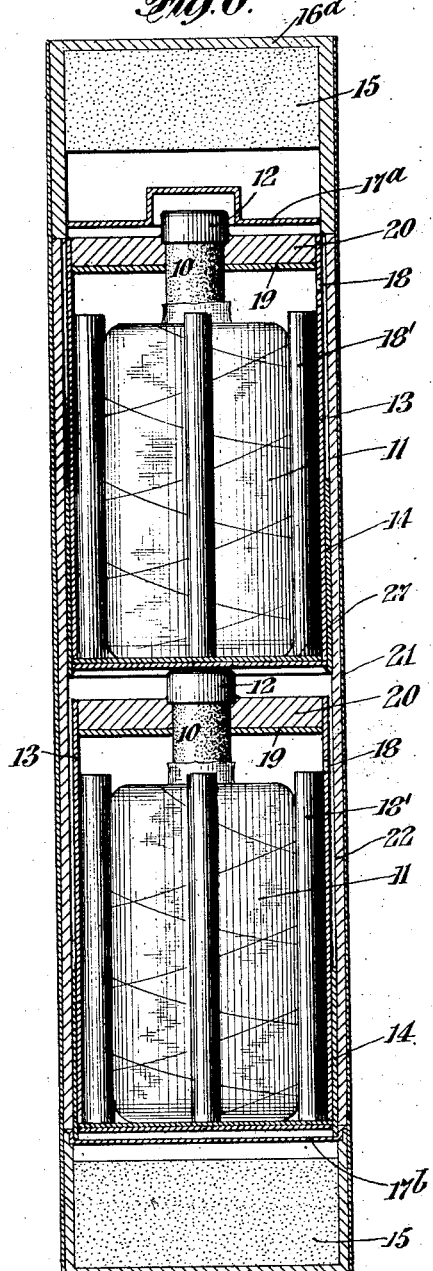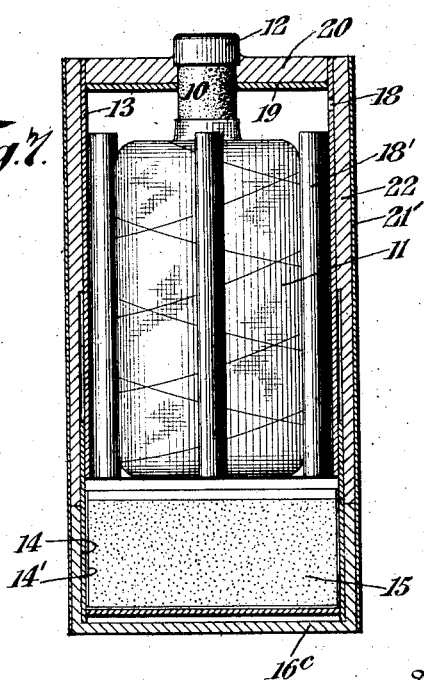

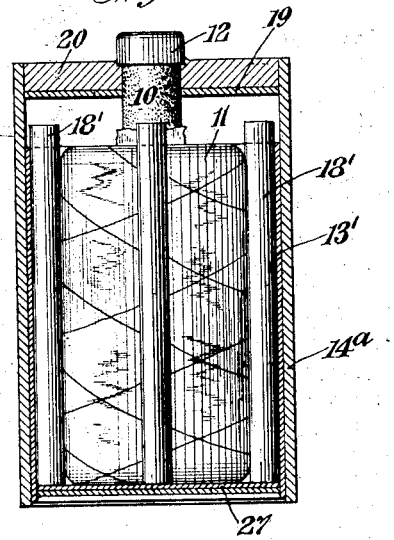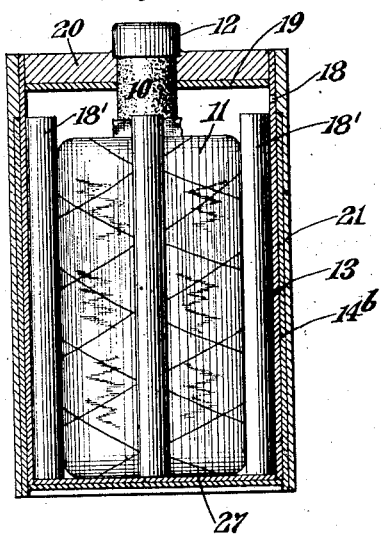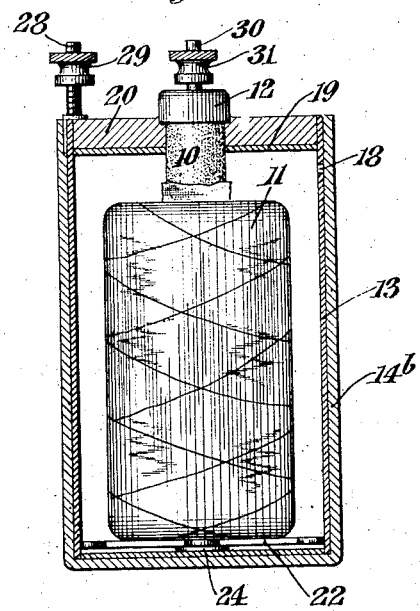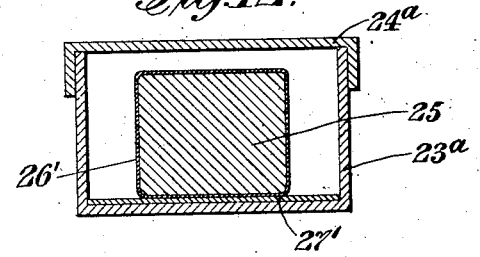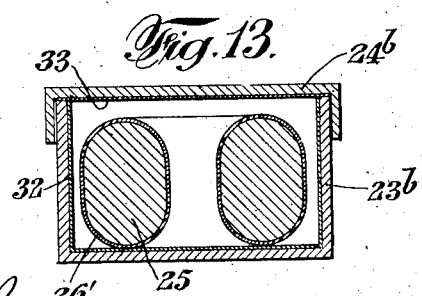

Patented Sept. 15, 1925.

1,553,659

UNITED STATES PATENT OFFICE.

SERGE APOSTOLOFF, OF NEW YORK, N. Y.

DRY CELL.

Application filed November 28, 1919. Serial No. 341,216.

*To all whom it may concern:*

Be it known that I, SERGE APOSTOLOFF, a subject of the King of Great Britain, residing in the borough of Manhattan, city, county, and State of New York, have invented certain new and useful Improvements in Dry Cells, of which the following is a specification.

This invention relates to improvements in electric dry batteries of the type where the electrolyte is retained out of contact with the electrodes until it is desired to use the cell.

One object of my invention is to produce a dry battery or cell, the parts of which may be separately manufactured and which need not be assembled until it is desired to activate the cell.

In the old type of dry cell the action of the electrolyte paste upon the metallic container was quite destructive, even when the cell was on open circuit.

By my invention all destructive action of the paste on the metallic container is entirely eliminated while such cells are held in stock by a dealer or by a purchaser prior to their actual use. The cells manufactured according to my invention may therefore be shipped long distances without any impairment of their efficiency.

In my improved cell, the electrolytic paste is kept entirely apart from either of the electrodes. An auxiliary paste container is provided for each individual cell, said container being preferably associated in close proximity to the remaining parts of the cell while being kept in stock and during shipment.

I prefer to employ a cell comprising a tubular sleeve and a bobbin, the latter consisting of a carbon electrode and a depolarizing mass. In my preferred construction, the tubular sleeve comprises a shell electrode. The space between the bobbin and the shell electrode is designed for the reception of the electrolyte paste into which space it may be mechanically forced up from the auxiliary container whenever desired.

It will be obvious, however, that my auxiliary container is adapted for use with cells having other types of tubular sleeve. For example, it may be employed equally well with a cell provided with a fibrous sleeve such as is shown in Fig. 8 or in my co-pending application, Serial Number, 337,228, filed November 11, 1919.

Figure 1 is a sectional view of one form of my improved cell, the parts being shown in their original nonoperative position.

Figure 2 is a view of the cell shown in Figure 1 immediately after the paste has been forced from the auxiliary container into the space between the bobbin and the tubular electrode.

Figure 3 is a sectional view of the cell shown in Figures 1 and 2 in its final and operative condition.

Figure 4 is a sectional view of a cell provided with a modified form of auxiliary container, the container being carried upon the top of the cell.

Figure 5 is a sectional view of a cell provided with another modified form of auxiliary container, the container being fitted on the bottom of the cell.

Figure 6 is a sectional view of a battery constructed with two cell units carried therein, one of the auxiliary containers being carried at the top and the other at the bottom.

Figure 7 is a sectional view of a modified form of cell, the paste being carried in an insulated cup which is in telescopic relation with the tubular electrode.

Figures 8, 9 and 10 are sectional views in assembled position of further modified types of cell.

Figure 11 is a sectional view of a modified form of auxiliary container and showing the paste in the form of a spherical pellet or cake.

Figures 12 and 13 are sectional views of two modified constructions of my auxiliary container, together with two additional forms of paste cakes.

Referring to the cell shown in Figures 1, 2 and 3, the depolarizing mass is suitably secured in place around the carbon electrode 10 by a cloth container 11 or the like, and the carbon electrode 10 carries a metallic contact cap 12 upon its top. The tubular electrode 13 (preferably of zinc) is secured to the bobbin by means of the pitch 20 and the insulating washer 19 of fibrous material. The vertical wooden separating members 18' assist in centering the bobbin within the tubular electrode 13 and hold it securely in position. A washer 27 may be located at the bottom of the zinc cup to separate the bobbin from the zinc and prevent any possibility of short circuiting. In the initial and final position of the parts of the cell (Figures 1 and 3 respectively) the short metallic cup 14 (preferably of zinc) is fitted tightly over the bottom of the tubular electrode 13, and both are surrounded by an insulating tubular sleeve 21, preferably of cardboard. The tubular electrode 13 is provided with an air vent 18 near the top. The auxiliary container 16 carries a cake of solid paste 15, and is provided with a cover or closure 17. The inside diameters of the container 16 and short cup 14 are identical and are practically the same as the outside diameter of the tubular electrode 13. The bottom of the auxiliary container 16 contains a wooden disc 15' and is provided with a reduced portion 17' adapted to fit into the cover 17, whereby a group of the containers may be arranged in vertical series, or "nested", one above the other, the bottom of one fitting tightly in the top of the next adjacent lower container. A group of nested auxiliary containers may contain any convenient number and if desired may be provided with a waterproof wrapping extending the entire height of the series. Such an arrangement permits of convenient handling and facilitates the preservation of the paste in a hermetically sealed condition.

When it is desired to put a cell into use, the first operation is to remove the short metallic cup 14 from the bottom. The cover 17 of the auxiliary container 16 is next removed and after fitting the container around the bottom of the tubular electrode 13, it is pushed upwardly to force the paste into position as shown in Figure 2. While carrying out the above operation the outside tube 21 may be raised as shown, or if preferred, may be removed entirely from the cell. It is now merely necessary to slip off the container 16 and substitute the cup 14 therefor in order to make the cell completely ready for action. The tube 21 may then be pushed down into place (see Figure 3).

In Figure 4, the construction of the cell is exactly similar to that in Figures 1, 2 and 3, but in this case the auxiliary container 16$^a$ carrying the paste 15 is secured in place upon the top of the cell, the container being supported by the tubular member 21 of non-conducting material which is positioned on the outside of the cell. The consistency of the paste 15 is such that it will remain permanently in the inverted position shown, until forcibly distributed therefrom. The container 16$^a$ is provided with a closure 17$^a$ of fibrous material, the latter having a central cavity adapted to fit over the top of the bobbin 12 whereby a very compact arrangement is secured. The outer wrapper or label 21' may be glued to the parts 16$^a$ and 21 and serves to hold these parts in their original inoperative position. The label also assists in hermetically sealing the paste 15.

In the cell shown in Figure 5, the auxiliary container 16 instead of being placed upon the top of the cell is carried at the bottom. The fibrous cover 17$^b$ fits over the top of the container and forms a seat for the zinc cup 14. This cover 17$^b$, together with the outer wrapping 21' assists in hermetically sealing the electrolyte paste 15.

In Figure 6 is shown a battery of the multi-unit type wherein two cells are arranged end to end within an outer holder 22 and wrapper 21'. The auxiliary container 16$^a$ for the upper cell is secured in place upon the top in the same manner as in the cell shown in Figure 4, while the auxiliary container 16$^b$ for the lower cell is secured at the bottom as in the cell shown in Figure 5.

The operation of assembling the cells shown in Figures 4, 5 and 6 is similar to that in Figures 1, 2 and 3 and need not therefore be described here. It should be noted, however, that with the cells shown in Figures 4, 5 and 6, the outer wrapper must first be severed on the line of division between the auxiliary container and the outer cell container. After severing the wrapper which may be accomplished either by cutting or by twisting, the cells may then be taken apart and activated as already fully described above.

In Figure 7 a still further modified form of cell is shown. In this cell the paste is initially placed in the bottom of the cup 14 but is insulated therefrom by a coating 14' of shellac, celluloid or other similar material. The cap member 16$^c$ initially surrounds the cup 14, and is held in place by the outer wrapping 21'. Before activating the cell, it is necessary to detach the member 16$^c$ and to force the cup 14 upwardly around the bobbin.

Figure 8 shows a still further modified form of cell. In this cell the bobbin 11, consisting of the carbon 10, cap 12, and depolarizing mass, is suspended by means of the seal 20 and washer 19 within the outer tubular fibrous container 14$^a$. The zinc cup 13' is initially located within the outer element 14$^a$, being spaced from the bobbin by the longitudinal spacers 18', preferably of wood. The washer 27 in the bottom of the cup serves to insulate the latter from the bobbin.

In each of the cells above described, the brass contact cap 12 upon the top of the carbon constitutes one terminal of the cells, while the bottom of the short zinc cup 14' forms the other terminal.

It will be obvious that it lies within the spirit of my invention to make the lower zinc contact cup of any length desired. Instead of a short zinc cup I may use a long cup such as is disclosed in Figure 9 or in my co-pending prior application Serial Number 257,651, filed October 10, 1918.

In Fig. 9 is shown a still further modified type of dry cell with which any one of the forms of auxiliary containers may be employed. In this cell the bobbin is surrounded by the longitudinal spacing members 18'. These spacers are secured to the bobbin and are in contact with the zinc tube 13. The zinc cup 14$^b$ fits about the tube 13 in the same manner as in the cells shown in Figures 1 to 6, but in this instance the cup extends substantially the full length of the tube 13.

In Figure 10 a somewhat different form of cell is shown. In this cell the longitudinal spacing members are omitted and in their place a perforated spacing disc 22 is substituted, this disc being secured upon the bottom of the bobbin in any suitable manner as by means of the wax seal 24, and also secured to the bottom of the zinc tube 13. In this cell the fibrous cup 14$^b$ fits upon the outside of the tube 13. At the top of the carbon 10 is a threaded binding post 30 carrying the nut 31 for engagement with an electrical conductor. The other terminal of this cell consists of the binding post 28 secured to the top of the zinc tube 13 and is provided with the nut 29 for engagement with a similar conductor.

In all of the cells except that shown in Figure 8 it will be noted that a vent 18 is provided to allow the entrapped air to escape when the paste is being forced upwardly to activate the cells. In the cell shown in Figure 8, the air is not trapped but is free to escape between the cup 13' and tube 14$^a$ which fit one another loosely.

It will be noted that in preparing the cells shown in Figures 4–7 for delivery to the trade, it is customary to completely cover the cells with a wrapper or label. If desired a label may be provided also on the cell shown in Figures 1–3. The labels when used are secured in place by any suitable adhesive such as glue and assist in maintaining the parts of the cells in fixed relation. It is also customary to give the completed devices a final dip in melted paraffin or like material, so that a thin exterior waterproof coating will be obtained which will hermetically seal the cells and protect them from the action of the atmosphere.

The electrolytic paste which I prefer to use should be made of such a consistency that it will not flow until pressure is put upon it. In this manner creeping of the salts and consequent corrosion is prevented.

Several modified forms of auxiliary containers and paste cakes are shown in Figures 11, 12 and 13. In Figure 11, the container is composed of fibrous non-conducting material and comprises the cup 23 covered with the closure 24. The cake of electrolyte paste may be in the form of a sphere 25 preferably covered with waterproof material 26, such as waxed paper, and being supported upon the insulating washer 27.

In Fig. 12 is shown an auxiliary paste container similar to that shown in Figure 11. In this instance, however, the container 23$^a$ and the cover 24$^a$ are formed from thin sheet metal, preferably by stamping. A paste cake 25 in the form of a cube rests upon the washer 27' in the bottom of the container. This cake is suitably coated with waterproof material 26'.

In Fig. 13 the auxiliary container consisting of the cup 23$^b$ and cover 24$^b$ is formed of thin metal with an interior coating of enamel, celluloid or the like. The coatings for the cup and the cover are referred to in the drawings by numerals 32 and 33 respectively. Within the container is shown a still further modified form of paste cake 25 having a waterproof coating 26'. As will be evident, no insulating washer is necessary in this form of auxiliary container. Any of the auxiliary containers or paste cakes shown in Figures 11, 12 and 13 may be substituted for the auxiliary container and cake shown in Figure 1, within the spirit of the invention.

In carrying out my invention I do not desire to be limited to any of the embodiments shown herein, it being understood that the constructions can be varied through wide limits within the general principles and scope of the invention.

I claim:

1. In a dry cell of the type described, a bobbin, a tubular electrode open at the bottom surrounding said bobbin and connected thereto by non-conducting material, a short zinc cup fitting over the lower end of said electrode, and an auxiliary cup having the same interior dimensions as the zinc cup, said auxiliary cup containing electrolyte paste.

2. In a dry cell of the type described, an auxiliary paste container comprising a short cup-shaped member of non-conducting material having a cover fitting the open end thereof.

3. In a dry cell of the type described, an auxiliary paste container comprising a short cup-shaped member of non-conducting material having a cover fitting the open end thereof, said container having a cake of electrolyte paste therein.

4. In a dry cell of the type described, an auxiliary paste container having a closure therefor, said closure having a depression of a shape to fit around the top of the bobbin of the cell during cell inactivity.

5. A primary dry cell having an activating paste initially out of contact with both electrodes, said paste being carried in an auxiliary container.

6. A primary dry cell having a paste electrolyte in which the liquid constituent of the electrolyte is initially out of contact with both electrodes.

7. A primary dry cell of the type described, comprising two electrodes, a depolarizer, and a pasty material for activating the cell, said material being initially carried in an auxiliary container and being out of operative relation with both electrodes.

8. In a dry cell of the type described, a bobbin, a tubular electrode connected thereto, a cup-shaped contact member fitting the bottom of said tubular electrode and adapted to be moved longitudinally with relation thereto, said cup-shaped member being shorter than the tubular element and containing a quantity of paste sufficient to activate the cell upon telescoping the cup-shaped element and the tubular electrode.

9. In a dry cell of the class described, two telescoping cup-shaped members containing the anode and cathode of the cell, and an auxiliary cup-shaped member containing a supply of paste, initially held adjacent the telescoping members.

10. As an article of manufacture for use in a dry cell of the type described, a bobbin surrounded by a tubular electrode, a paste container comprising a cylindrical tube hermetically closed at both ends, said tube having the same internal diameter as the exterior of the tubular electrode.

11. As an article of manufacture for use in a dry cell, a bobbin surrounded by a tubular zinc sleeve, said sleeve being closed at one end by a short zinc cup, a paste container comprising a cylindrical tube hermetically closed at both ends, said tube having the same internal diameter as the exterior of the tubular sleeve.

12. As an article of manufacture for use in a dry cell of the type described, a bobbin electrode having a surrounding tubular sleeve connected therewith, a short cup-shaped member fitting the bottom of said sleeve and movable longitudinally with relation thereto.

13. As an article of manufacture for use in a dry cell, a bobbin electrode, a tubular zinc sleeve surrounding said bobbin electrode and connected therewith, a short contact member closing the bottom of said sleeve and movable relatively thereto in a longitudinal direction.

14. In a dry cell of the type described, a tubular zinc electrode, a bobbin contained within said tubular electrode and connected thereto, a zinc cup-shaped contact member fitted to the bottom of said electrode, and means for activating the cell comprising a supply of paste carried in an auxiliary container, said container having a cover and having such interior dimensions that said container will fit accurately on the outside of said tubular electrode.

15. In a dry cell having a paste electrolyte, a cathode, a depolarizing means, a tubular sleeve surrounding said cathode and depolarizing means, a cup-shaped metallic anode member fitting said tubular sleve, said anode member carrying paste, a part of the interior metallic surface of said anode member being insulated from said paste.

16. In a dry cell of the type described, a tubular electrode member having an insulative coating on its interior surface.

17. The process of manufacture of a dry cell having a bobbin within a tubular shell, a metallic closure for the bottom thereof and an auxiliary paste container comprising: placing paste in the auxiliary container, removing the metallic cap from the tubular shell-electrode, forcing the paste from the auxiliary container into the space between the bobbin and the tubular shell-electrode, removing the auxiliary container, and closing the bottom of the shell.

18. The process of manufacture of a dry battery of the type described comprising: placing paste in an auxiliary container, fitting the auxiliary container upon the bottom of the outer shell of the battery, forcing the paste from the auxiliary container into the battery between the bobbin and the outer shell, removing the auxiliary container, and closing the bottom of the shell.

19. The process of manufacture of a dry cell having a bobbin and a tubular shell-electrode comprising: placing paste in an auxiliary container, closing the bottom of the tubular electrode with a metallic cap; removing the metallic cap from the tubular electrode, forcing the paste from the auxiliary container into the space between the bobbin and the tubular electrode, and replacing the metallic cap upon the bottom of the tubular electrode.

20. A dry cell of the kind described, comprising a hollow zinc electrode, a depolarizer mix bobbin therein spaced therefrom, a cup attached to the lower end of the hollow electrode, a supply of activating material in the cup normally out of contact with the mix and adapted to be moved into contact therewith by relative longitudinal adjustment of the cup and zinc electrode.

21. A dry cell of the kind described, comprising a hollow zinc electrode, a depolarizing mix therein spaced therefrom, a cup attached to the lower end of the zinc electrode, said cup having a conducting bottom, a supply of activating material in the cup normally out of contact with the mix and adapted to be moved by relative longitudinal adjustment of the zinc electrode and receptacle to activate the cell and electrically connect the zinc with the metallic bottom.

22. A dry cell of the kind described, comprising a tubular zinc electrode, a depolarizing mix therein spaced therefrom, a cup attached to the lower end of the zinc electrode, a supply of activating material in the cup normally adjacent but out of contact with the mix, a seal in the cup, said cup and tubular zinc being adapted to be moved by relative longitudinal adjustment thereof to force the activating material past the seal to activate the cell.

23. A dry cell of the kind described, comprising a hollow zinc electrode, a depolarizing mix therein, a cup adapted to be attached to the lower end of the zinc in either of two positions, a supply of activating material in the cup out of contact with the mix in one of said positions and adapted to be moved into the other position to place the activating material in active relationship with the zinc electrode and mix by longitudinal movement of the cup on the zinc.

In testimony whereof, I have affixed my signature to this specification.

SERGE APOSTOLOFF.